United States Patent
Livshiz et al.

(10) Patent No.: US 6,840,215 B1
(45) Date of Patent: Jan. 11, 2005

(54) ENGINE TORQUE CONTROL WITH DESIRED STATE ESTIMATION

(75) Inventors: Michael Livshiz, Ann Arbor, MI (US); Scott J. Chynoweth, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/664,172

(22) Filed: Sep. 17, 2003

(51) Int. Cl.[7] .............................................. F02D 31/00
(52) U.S. Cl. ..................................... 123/352; 123/361
(58) Field of Search .............................. 123/352, 361, 123/399; 701/101

(56) References Cited

U.S. PATENT DOCUMENTS 6,250,292 B1 * 6/2001 Suhre ........................ 123/688
6,363,316 B1 * 3/2002 Soliman et al. ............. 701/104
6,701,246 B2 * 3/2004 Riedle et al. ............... 701/110
6,701,890 B1 * 3/2004 Suhre et al. ................ 123/350
6,718,255 B1 * 4/2004 Okubo ....................... 701/110

* cited by examiner

*Primary Examiner*—John T. Kwon
(74) *Attorney, Agent, or Firm*—Christopher DeVries

(57) ABSTRACT

An engine control system and method according to the invention controls torque in an internal combustion engine. Engine parameters are measured and an engine torque is estimated. A desired air per cylinder of the engine is calculated. A desired manifold absolute pressure of a manifold of the engine is calculated based on a function of engine torque. A desired RPM of the engine is calculated based on a measured engine RPM and a reference torque of the engine. A desired area is calculated based on the desired manifold absolute pressure. The desired area is implemented into the controller to control torque output of the engine.

18 Claims, 6 Drawing Sheets

ENGINE TORQUE CONTROL WITH DESIRED STATE ESTIMATION

FIELD OF THE INVENTION

The present invention relates to engine control systems, and more particularly to an engine control system for improving torque control during transient and steady state operation.

BACKGROUND OF THE INVENTION

Referring now to FIG. 1, an exemplary method for controlling torque of an engine is shown generally at 10. Torque control begins with step 12. In step 14, control determines if the engine is operating. If the engine is operating, instantaneous RPM (R), manifold absolute pressure (MAP), mass air flow (MAF) and air/fuel ratio (AF) are measured in step 16. If the engine is not operating, control ends in step 28. In step 18, a desired air per cylinder ($APC_{des}$) is estimated based on an inverse function of torque. $APC_{des}$ is determined based on parameters measured in step 16 and other measured values. $APC_{des}$ may be characterized by the following equation:

$$APC_{des}=T_{apc}^{-1}(T_{ref},R,S,D,AF,OT,\Omega) \quad (1)$$

Where $T_{ref}$ is reference torque, S is spark, D is dilution based on exhaust gas, OT is oil temperature and # is the number of cylinders of the engine. In step 20, engine torque is estimated by the following equations:

$$T=\eta_{af}*\eta_{\Omega}*(T_w+T_{oi}) \quad (2)$$

$$T_w=APC_{des}+a_R*R+a_S*S+a_S*S^2 \quad (3)$$

Where $\eta_{af}$ is the efficiency of air flow through the engine manifold, $\eta_{\#}$ is the efficiency of the cylinders of the engine, $T_w$ is the warm up torque of the engine, $T_{oi}$ is the initial torque of the engine and $a_i$ are coefficients.

In step 22, the desired MAF is calculated based on the follow:

$$MAF_{des}=APC_{des}*R \quad (4)$$

In step 24 the desired area is calculated based on the following:

$$A_{des} = \frac{APC_{des}*R*\sqrt{R_{gas}*T}}{15*B*\Phi\left(\frac{P}{B}\right)} \quad (5)$$

where R is the measured RPM, $R_{gas}$ is the ideal gas constant, B is barometric pressure and P is the measured MAP. Equation (5) is hereinafter referred to as the compressible flow equation. Control then loops back to step 14.

As shown, desired area ($A_{des}$) is a function of RPM (R) and manifold pressure (P). Under transient conditions, the controller does not have lead information enabling fast torque control response. In this regard, an undesirable time delay may occur while correcting MAP and RPM to a desired level. For example, as illustrated in FIG. 1A, a time delay $\Delta t$ may occur. In this way, MAP will grow from idle to wide open throttle causing a delay in area opening. As a result, equation (5) will not provide an instantaneous change in area. A similar undesirable time delay may also result during engine torque control for RPM correction.

SUMMARY OF THE INVENTION

An engine control system according to the invention includes an engine having a manifold. A controller calculates a desired area based on a desired manifold absolute pressure of said manifold. The controller calculates a warm-up torque based on a requested torque and the manifold absolute pressure is based on the warm-up torque.

A method according to the invention controls torque in an internal combustion engine. Engine parameters are measured and an engine torque is estimated. A desired air per cylinder of the engine is calculated. A desired manifold absolute pressure of a manifold of the engine is calculated based on a function of engine torque. A desired area is calculated based on the desired manifold absolute pressure. The desired area is implemented into the controller to control torque output of the engine.

A method according to the invention controls torque in an internal combustion engine. Engine parameters are measured and an engine torque is estimated. A desired air per cylinder of the engine is calculated. A desired RPM of the engine is calculated based on a measured engine RPM and a reference torque of the engine. A desired area is calculated based on the desired manifold absolute pressure. The desired area is implemented into the controller to control torque output of the engine.

A method according to the invention controls torque in an internal combustion engine. Engine parameters are measured and an engine torque is estimated. A desired air per cylinder of the engine is calculated. A desired manifold absolute pressure of a manifold of the engine is calculated based on a function of engine torque. A desired RPM of the engine is calculated based on a measured engine RPM and a reference torque of the engine. A desired area is calculated based on the desired manifold absolute pressure. The desired area is implemented into the controller to control torque output of the engine.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
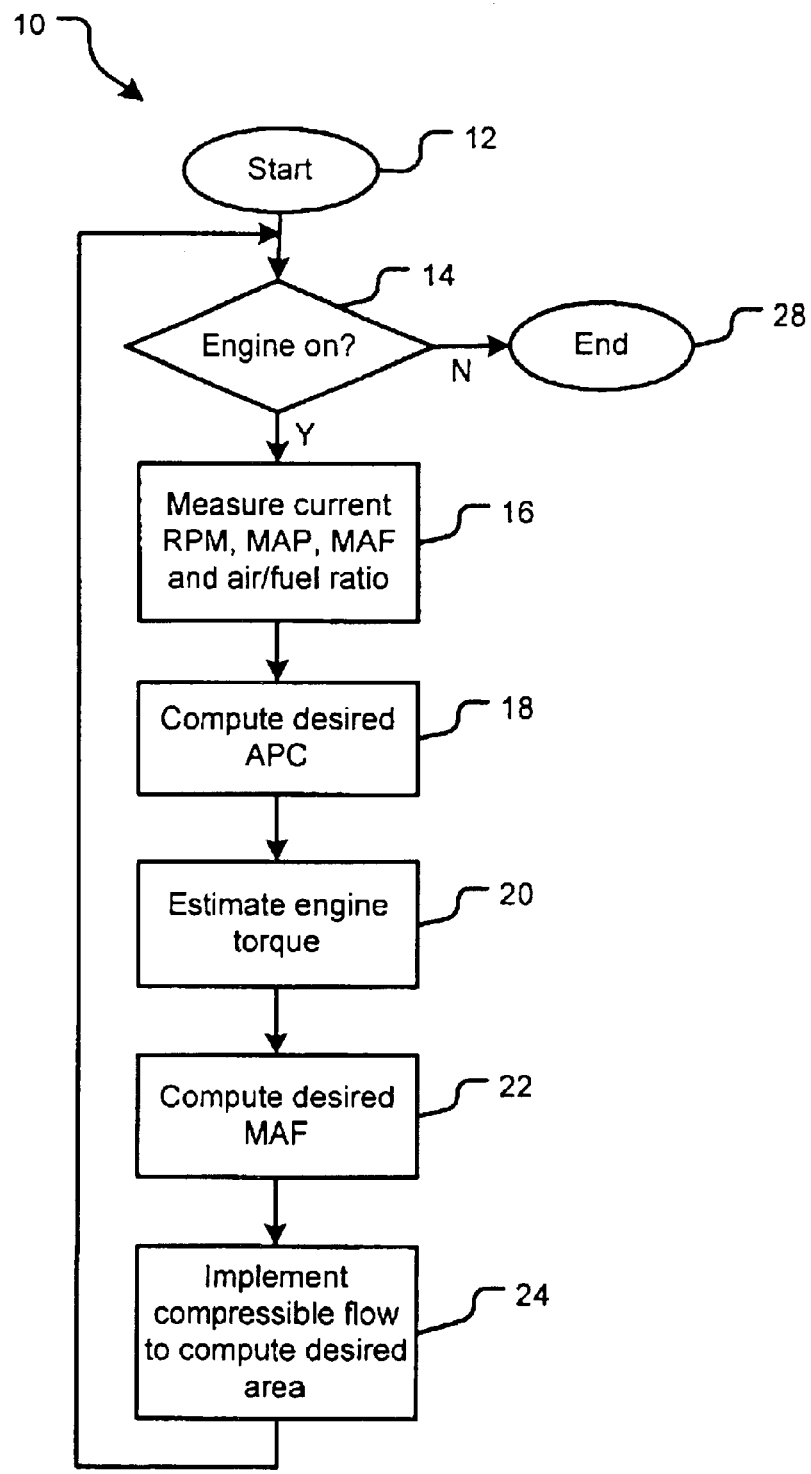
FIG. 1 is a flowchart illustrating prior art steps of performing torque control.
Figure 1A:
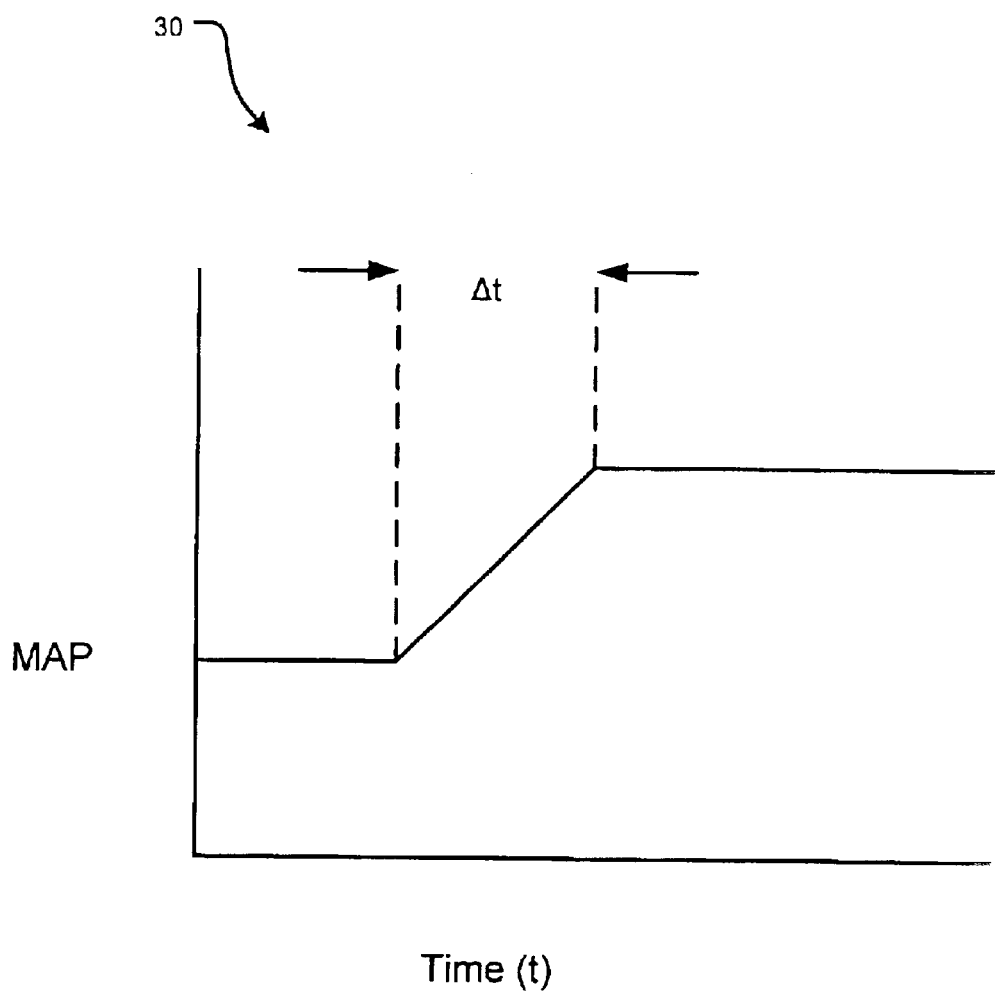
FIG. 1A is an illustration of manifold absolute pressure as a function of time for engines having torque control according to prior art.

The following description of the preferred embodiment(s) is merely exemplary in nature and is in no way intended to limit the invention, its application, or uses. For purposes of clarity, the same reference numbers will be used in the drawings to identify similar elements.

Figure 2:
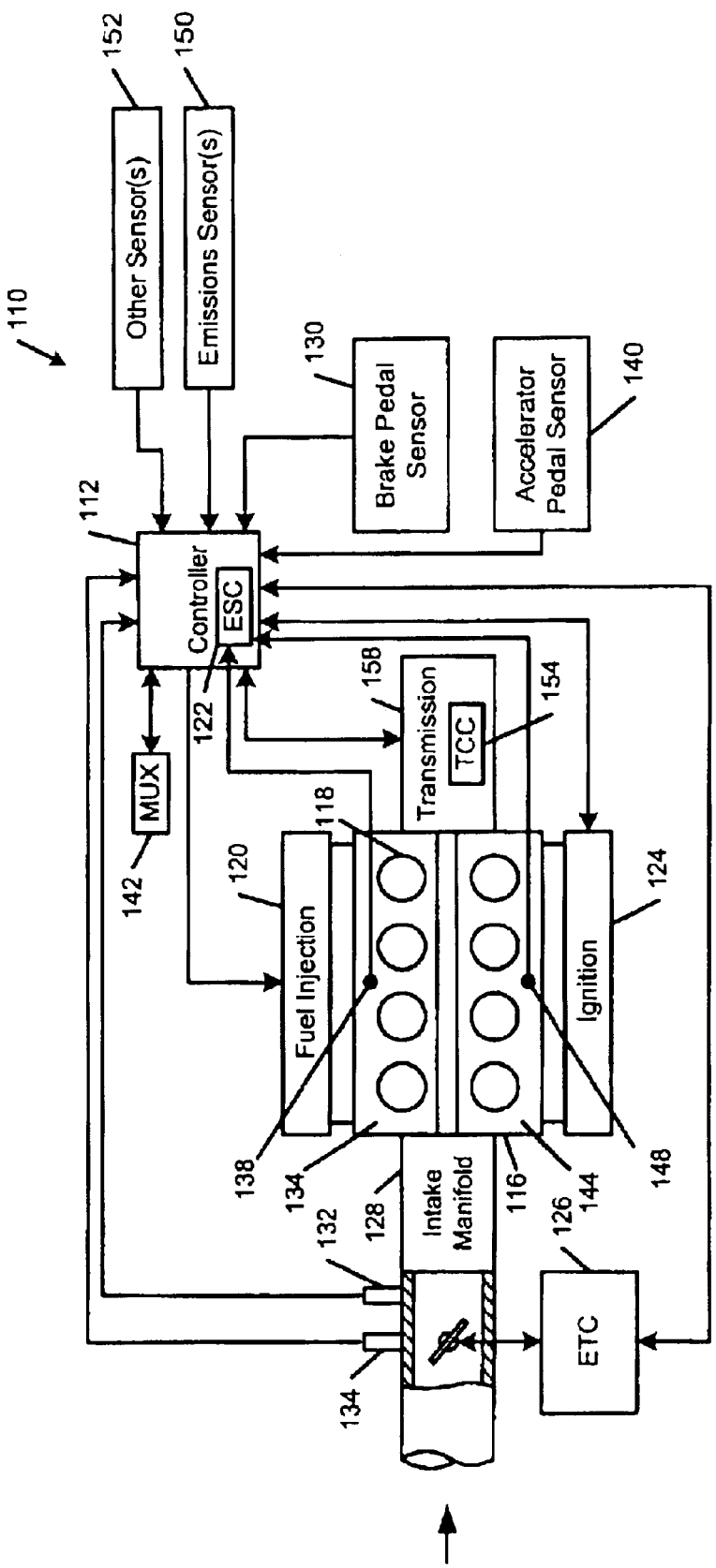
FIG. 2 is a functional block diagram of an engine control system that improves torque control accuracy according to the present invention.

Referring now to FIG. 2, an engine control system 110 according to the present invention includes a controller 112 and an engine 116. The engine 116 includes a plurality of cylinders 118 each with one or more intake valves and/or exhaust valves (not shown). The engine 116 further includes a fuel injection system 120 and an ignition system 124. An electronic throttle controller (ETC) 26 adjusts a throttle area of an intake manifold 28 based upon a position of an accelerator pedal (not shown) and a throttle control algorithm that is executed by the controller 112. One or more sensors 134 and 132 such as a manifold pressure sensor and/or a manifold air temperature sensor sense pressure and/or air temperature in the intake manifold 128. The controller 112 receives pedal position information from brake and accelerator pedal position sensors 130 and 140. An output of the engine 116 is coupled by a torque converter clutch 154 to a transmission 158.

Figure 3:
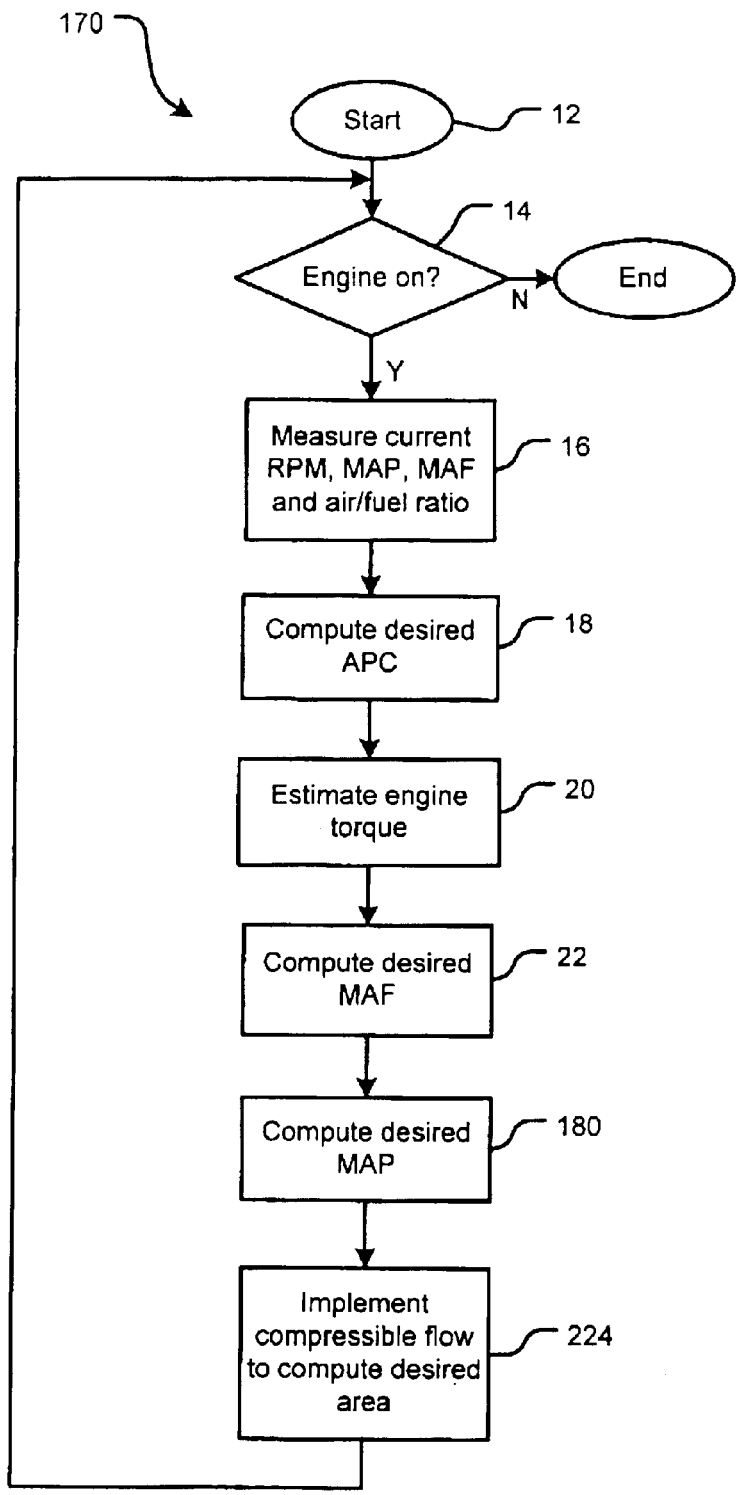
FIG. 3 is a flowchart illustrating steps for controlling engine torque according to a first method of the present invention.

Referring now to FIGS. 2 and 3, steps for controlling engine torque according to a first method are shown generally at 170. The torque control method 170 includes similar steps as described with respect to the torque control method 10. In the first method, a desired MAP is calculated in step 180 during torque control. In step 180, the controller 112 utilizes the following equations.

$$P_{des} = F_P^{-1}(T_{ref}, R, S, D, AF, OT, \Omega) \quad (6)$$

$$T = \eta_{of} * \eta_\Omega * (T_w + T_{oi}) \quad (7)$$

$$T_w = a_P * P_{des} + a_R * R + a_S * S + a_{S^2} * S^2 \quad (8)$$

Equation (6) illustrates desired MAP as an inverse torque model. Equation (7) represents an engine torque model where $T_w$ is the warm up portion. T is a requested torque, $\eta_{of}$ is an efficiency of air flow of the intake manifold 128, $\eta_\Omega$ is an efficiency of the cylinders 118 of the engine 116 and $T_{ot}$ is an initial torque. From equation (7), all variables are known except $T_w$. The controller 112 solves for $T_w$ and implements the result into equation (8). In equation (8), $P_{des}$ or desired MAP is calculated.

Once the controller 112 has calculated the desired MAP, the compressible flow equation is utilized in step 224 to calculate the desired area using $P_{des}$ rather than the measured P. Or more specifically, $$A_{des} = \frac{APC_{des} * R * \sqrt{R_{gas} * T}}{15 * B * \Phi\left(\frac{P_{des}}{B}\right)} \quad (9)$$

Desired MAP control estimation utilizing a calculated MAP ($P_{des}$) enables faster transient response as compared to implementing a measured P during torque control. Control then loops to step 14.

Figure 4:
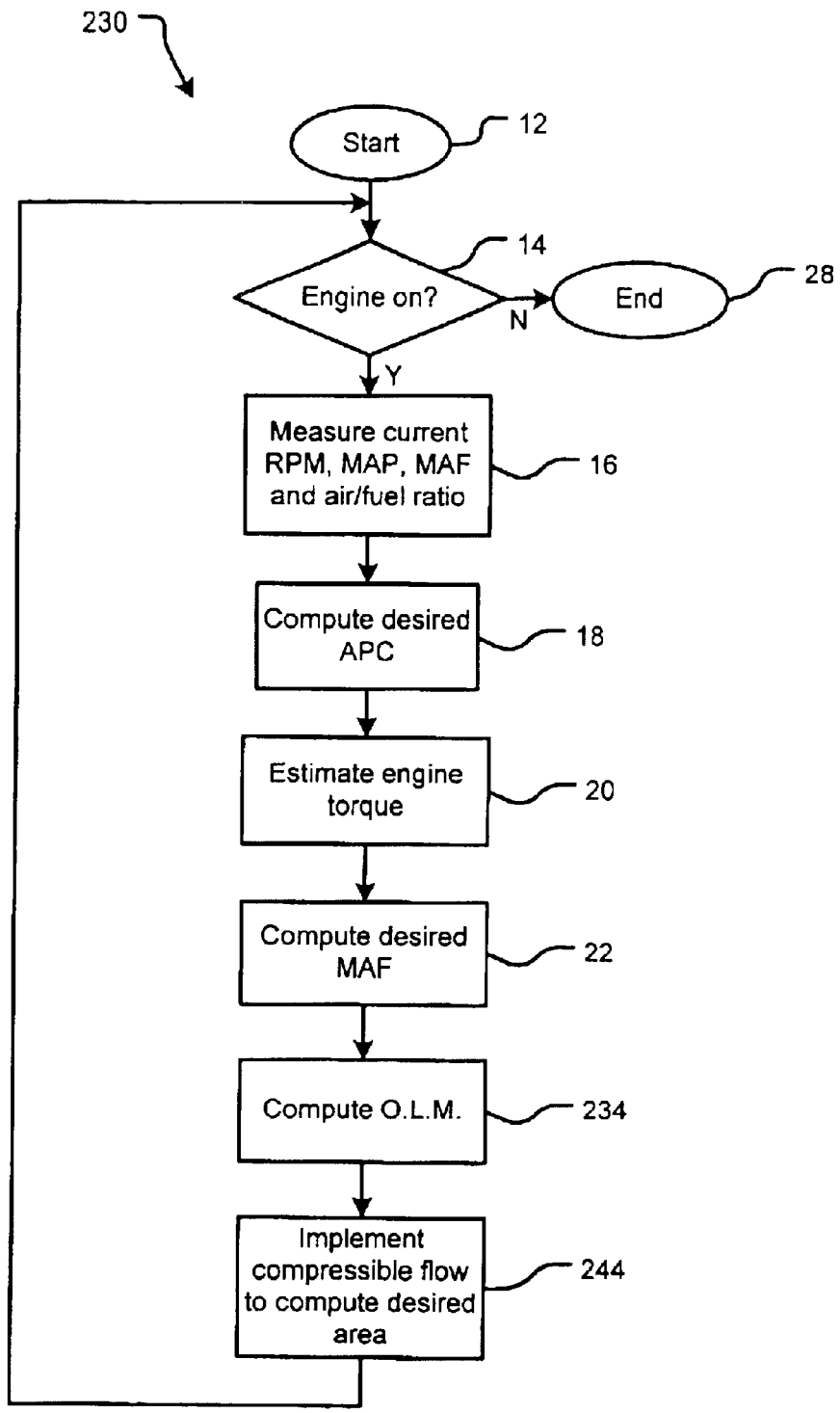
FIG. 4 is a flowchart illustrating steps for controlling engine torque according to a second method of the present invention.

With reference now to FIG. 4, steps for controlling engine torque according to a second method are shown generally at 230. The torque control method 230 uses an open loop multiplier (OLM) and includes similar steps as described with respect to the torque control method 10. In the second method, a desired RPM is calculated in step 234 during torque control. In step 234, control utilizes the following equations:

$$APC_{des} = k * \eta(P_{des}, R_{des}) * P_{des} \quad (10)$$

$$\eta = a_0 + a_1 * R + a_2 * R^2 + a_3 * P + a_4 * P^2 \quad (11)$$

$$\eta = \frac{APC_{des}}{k * P_{des}} = a_0 + a_1 * R_{des} + a_2 * R_{des}^2 + a_3 * P_{des} + a_4 * P_{des}^2 \quad (12)$$

$$R_{des} = f(APC_{des}, P_{des}, a_1) \quad (13)$$

$$R_{des} = R * OLM \quad (14)$$

$$OLM = f(APC_{des}, P_{des}, a_1) = f(T_{ref}, R) \quad (15)$$

Air per cylinder (APC) is proportional to volumetric efficiency ($\eta$) and manifold pressure (P). Accordingly, equation (10) represents a desired air per cylinder (APC) as a function of volumetric efficiency ($\eta$) and desired manifold pressure ($P_{des}$) where k is a constant.

In equation (11), volumetric efficiency ($\eta$) is a function of RPM (R) and manifold pressure (P). Therefore, utilizing equations (10) and (11), efficiency ($\eta$) may be characterized by equation (12). As a result and as shown in equation (13), desired RPM ($R_{des}$) is a function of desired air per cylinder ($APC_{des}$), desired manifold pressure ($P_{des}$) and coefficients $a_i$. The function as shown in equation (13), however, may be difficult to calculate. Consequently, for some applications, the desired RPM calculation may be replaced by an OLM representing numeric approximation of the desired RPM. The desired RPM and related OLM are characterized by equations (14) and (15).

Once the controller 112 has calculated desired RPM, the compressible flow equation is utilized in step 244 to calculate the desired area using the calculated desired RPM $R_{des}$ rather than the measured R. Or more specifically, $$A_{des} = \frac{APC_{des} * R_{des} * \sqrt{R_{gas} * T}}{15 * B * \Phi\left(\frac{P}{B}\right)} \quad (16)$$

Desired MAP control estimation utilizing a calculated RPM enables faster transient response as compared to implementing a measured RPM during torque control. It is noted that a measured manifold pressure (P) is used in torque control method 230. Control then loops back to step 14.

Figure 5:
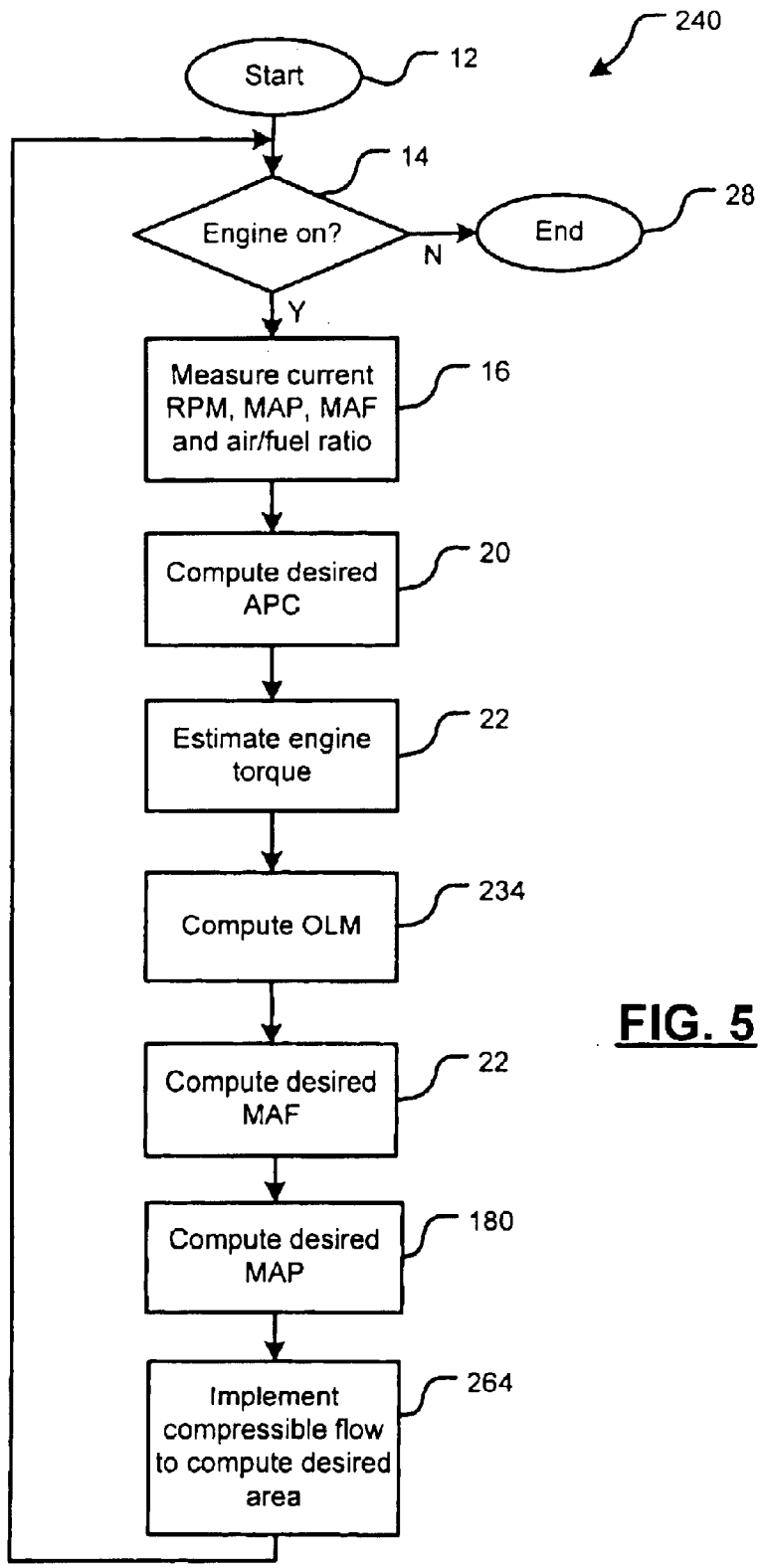
FIG. 5 is a flowchart illustrating steps for controlling engine torque according to a third method of the present invention.

Referring now to FIGS. 2 and 5, steps for controlling engine torque according to a third method are shown generally at 240. The torque control method 240 includes similar steps as described with respect to the torque control method 10. In the third method, both a desired MAP ($P_{des}$) and a desired RPM ($R_{des}$) are calculated in steps 180 and 234, respectively, during torque control. The values of $P_{des}$ and $R_{des}$ are obtained utilizing the equations set forth with respect to torque control method 170 and 230 above.

The compressible flow equation is again utilized in step 264. For this method however, both $P_{des}$ and $R_{des}$ are each implemented rather than a measured manifold pressure (P) and measured RPM (R). The compressible flow equation may be represented by the following equation.

$$A_{des} = \frac{APC_{des} * R_{des} * \sqrt{R_{gas} * T}}{15 * B * \Phi\left(\frac{P_{des}}{B}\right)} \quad (17)$$

Desired MAP and RPM control estimation utilizing a calculated MAP and a calculated RPM enables faster transient response as compared to implementing a measured P and a measured R during torque control. Control then loops to step 14.

Those skilled in the art can now appreciate from the foregoing description that the broad teachings of the present invention can be implemented in a variety of forms. In particular, the equations set forth herein with respect to torque control are merely exemplary. Accordingly, variations to these equations may be implemented while reaching similar results and are considered within the scope of this invention. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system comprising:
   an engine having a manifold; and
   a controller that calculates a desired area based on a desired manifold absolute pressure of said manifold and a warm-up torque based on a requested torque wherein said desired manifold absolute pressure is based on said warm-up torque.

2. The engine control system of claim 1 wherein said warm-up torque is further based on air flow efficiency of said manifold.

3. The engine control system of claim 1 wherein desired area is further based on a desired RPM and a reference torque of said engine.

4. The engine control system of claim 1 wherein said requested torque is the product of an airflow efficiency of said engine, an efficiency of the cylinders of said engine and the sum of said warm-up torque and an initial torque of said engine.

5. The engine control system of claim 4 wherein said warm-up torque is the sum of the products of said desired manifold absolute pressure and a manifold pressure coefficient, an instantaneous RPM and an RPM coefficient, a spark and a spark coefficient and a squared spark and a squared spark coefficient.

6. A method for controlling torque in an internal combustion engine, said method comprising:
   measuring engine parameters;
   estimating engine torque;
   calculating desired air per cylinder of said engine;
   calculating desired manifold absolute pressure of a manifold of said engine based on a function of engine torque;
   calculating desired area based on said desired manifold absolute pressure; and
   using said desired area to control torque output of said engine.

7. The method of claim 6 wherein calculating manifold absolute pressure includes;
   calculating a warm-up torque based on a requested torque; and
   calculating a desired manifold absolute pressure based on said warm-up torque.

8. The method of claim 7 wherein said warm-up torque is further based on air flow efficiency of said manifold.

9. The method of claim 6 wherein measuring engine parameters includes measuring a current engine RPM, a current manifold absolute pressure, a current manifold air flow and a current air fuel ratio.

10. The method of claim 6 further comprising calculating a desired manifold air flow of said manifold of said engine.

11. A method for controlling torque in an internal combustion engine, said method comprising:
    measuring engine parameters;
    estimating engine torque;
    calculating desired air per cylinder of said engine;
    calculating desired RPM of said engine based on a measured engine RPM and a reference torque of said engine;
    calculating desired area based on said desired RPM; and
    using said desired area to control torque output of said engine.

12. The method of claim 11 wherein measuring engine parameters includes measuring a current engine RPM, a current manifold absolute pressure, a current manifold air flow and a current air fuel ratio.

13. The method of claim 11 further comprising calculating a desired manifold air flow of said manifold of said engine.

14. A method for controlling torque in an internal combustion engine said method comprising:
    measuring engine parameters;
    estimating engine torque;
    calculating desired air per cylinder of said engine;
    calculating desired manifold absolute pressure of a manifold of said engine based on a function of engine torque;
    calculating desired RPM of said engine based on a measured engine RPM and a reference torque of said engine;
    calculating desired area based on said desired manifold absolute pressure and said desired RPM; and
    using said desired area to control torque output of said engine.

15. The method of claim 14 wherein calculating manifold absolute pressure includes;
    calculating a warm-up torque based on a requested torque; and
    calculating a desired manifold absolute pressure based on said warm-up torque.

16. The method of claim 15 wherein said warm-up torque is further based on air flow efficiency of said manifold.

17. The method of claim 14 wherein measuring engine parameters includes measuring a current engine RPM, a current manifold absolute pressure, a current manifold air flow and a current air fuel ratio.

18. The method of claim 14 further comprising calculating a desired manifold air flow of said manifold of said engine.

* * * * *